United States Patent
Chang et al.

(10) Patent No.: US 10,759,296 B2
(45) Date of Patent: Sep. 1, 2020

(54) CHARGING APPARATUS FOR ELECTRIC VEHICLE

(71) Applicants: Chih-Yuan Chang, Changhua (TW); Tsair-Rong Chen, Changhua (TW); Po-Hsuan Chen, Changhua (TW); Bing-Yuan Lai, Taichung (TW)

(72) Inventors: Chih-Yuan Chang, Changhua (TW); Tsair-Rong Chen, Changhua (TW); Po-Hsuan Chen, Changhua (TW); Bing-Yuan Lai, Taichung (TW)

(*) Notice: Subject to any disclaimer, the term of this patent is extended or adjusted under 35 U.S.C. 154(b) by 127 days.

(21) Appl. No.: 16/039,645

(22) Filed: Jul. 19, 2018

(65) Prior Publication Data

US 2020/0023743 A1    Jan. 23, 2020

(51) Int. Cl.
| | | |
|---|---|---|
| *H02J 7/00* | (2006.01) | |
| *H02J 7/14* | (2006.01) | |
| *B60L 53/30* | (2019.01) | |
| *B60L 53/24* | (2019.01) | |
| *B60L 53/14* | (2019.01) | |
| *B60L 53/12* | (2019.01) | |

(52) U.S. Cl.
CPC ............... *B60L 53/30* (2019.02); *B60L 53/12* (2019.02); *B60L 53/14* (2019.02); *B60L 53/24* (2019.02); *B60L 2210/30* (2013.01)

(58) Field of Classification Search
USPC ...................................................... 320/108
See application file for complete search history.

(56) References Cited

U.S. PATENT DOCUMENTS

| | | | | |
|---|---|---|---|---|
| 5,684,380 A | * | 11/1997 | Woody | H01F 38/14 320/108 |
| 6,396,241 B1 | * | 5/2002 | Ramos | B60L 53/34 320/108 |
| 8,098,044 B2 | * | 1/2012 | Taguchi | B60L 58/26 320/109 |
| 9,371,007 B1 | * | 6/2016 | Penilla | B60L 11/1848 |
| 2001/0010454 A1 | * | 8/2001 | Oguri | H02J 7/025 320/101 |
| 2009/0079388 A1 | * | 3/2009 | Reddy | G06Q 30/0283 320/109 |
| 2012/0047971 A1 | * | 3/2012 | Katagiri | B60L 53/16 70/58 |
| 2013/0193923 A1 | * | 8/2013 | Kimura | B60L 11/1818 320/109 |

(Continued)

*Primary Examiner* — Alexis B Pacheco
(74) *Attorney, Agent, or Firm* — Che-Yang Chen; Law Office of Michael Chen

(57) ABSTRACT

A charging apparatus for electric vehicle may comprise a charging apparatus and an electric vehicle. The charging apparatus has a rectifier and a mobile connector, and the connector covered by a plastic cover has a primary coil electrically connected to the rectifier. The cover comprises a vertical first plane, and a plurality of first engaging portions formed at an outer periphery of the cover. The electric vehicle has a converter, a battery pack and a charge port, and the charge port covered by a plastic shell comprises a secondary coil electrically connected to the converter. The charge port has a vertical second plane and at least a second engaging portion. When the first plane of the connector is coupled to the second plane of the charge port, the primary coil and the secondary coil are spaced apart by a fixed distance, thereby achieving the effect of safe charging.

5 Claims, 8 Drawing Sheets

(56) References Cited

U.S. PATENT DOCUMENTS

| | | | | |
|---|---|---|---|---|
| 2013/0255333 | A1* | 10/2013 | Kurumizawa | E05B 83/28 |
| | | | | 70/237 |
| 2015/0042278 | A1* | 2/2015 | Leary | B60L 11/1824 |
| | | | | 320/109 |
| 2015/0367739 | A1* | 12/2015 | Boser | H01F 38/14 |
| | | | | 320/108 |
| 2018/0111494 | A1* | 4/2018 | Penilla | H02J 7/00 |

* cited by examiner

CHARGING APPARATUS FOR ELECTRIC VEHICLE

FIELD OF THE INVENTION

The present invention relates to a charging apparatus for electric vehicle and more particularly to a charging apparatus for electric vehicle achieving the effect of quick jointing and safe charging.

BACKGROUND OF THE INVENTION

Due to the problem of energy crisis, in recent years, people have focused on the development of all kinds of electric vehicles such as electric cars and electric locomotive. Moreover, for the recharging of electric vehicles, the electric vehicle charging stations are also built at designed places or sharing place with the gas stations. Generally, the charging apparatus for the electric vehicles has a charging plug, and a user can connect the charging plug to a battery socket of the electric vehicle to perform contacting charging through metal positive and negative electrodes. However, the contacting charging must be carried out by manual, which is inconvenient, and when the charging plug is improperly connected to the battery socket, the charging process could be dangerous such as electric leakage and explosion. Thus, some of the charging stations starts using the induction charging, which has a primary coil buried under a parking lot and configured to achieve induction charging with a secondary coil installed on the electric vehicle when the electric vehicle is parked on the parking lot.

However, the conventional charging apparatus for electric vehicle is disadvantageous because: (i) it is not easy to control the relative position between the primary and secondary coils such that the parking lot needs to bury a plurality of primary coils, which greatly increases the power consumption and causes primary coils to be overheated; and (ii) different electric vehicles have different-heights of chassis, which makes the secondary coil installed on the chassis of the electric vehicle to have different distance from the primary coils, and when the induction charging is carried out at too large or too small distance, the overheating of the coils and reduction of charging efficiency are prone to be happened. Therefore, there remains a need for a new and improved design for a charging apparatus for electric vehicle to overcome the problems presented above.

SUMMARY OF THE INVENTION

The present invention provides a charging apparatus for electric vehicle which comprises a charging apparatus and an electric vehicle. The charging apparatus has a rectifier and a mobile connector, and the connector covered by a plastic cover has a primary coil which is electrically connected to the rectifier. Moreover, the cover comprises a vertical first plane, and a plurality of first engaging portions formed at an outer periphery of the cover. Furthermore, each of the first engaging portions has two ends, and a hook portion is formed at an end of the first engaging portion which horizontally protrudes from the first plane, and the other end of the first engaging portion has a metal shank. In addition, the connector comprises an electromagnet positioned close to the shank. The electric vehicle has a converter, a battery pack and a charge port, and the converter is electrically connected to the battery pack. Furthermore, the charge port covered by a plastic shell comprises a secondary coil which is electrically connected to the converter. The charge port has a vertical second plane and at least a second engaging portion. When the first plane of the connector is coupled to the second plane of the charge port, the hooks are configured to engage on the second engaging portion, and the primary coil and the secondary coil are spaced apart by a fixed distance, thereby achieving the effect of safe charging.

In one embodiment, the rectifier of the charging apparatus is electrically connected to a processor which is adapted to control the primary coil to generate a first instant magnetic force, and the converter of the electric vehicle is electrically connected to a controller which is configured to control the secondary coil to generate a second instant magnetic force; when the connector is coupled with the charge port, the processor and the controller are configured to generate mutual attraction of the first instant magnetic force and the second instant magnetic force; when the connector is detached from the charge port, the processor and the controller are configured to generate mutual repulsion of the first instant magnetic force and the second instant magnetic force.

In another embodiment, the processor is connected to a first communicator while the controller is connected to a second communicator, and the first communicator and the second communicator are configured to communicate with each other so as to determine whether to start charging.

In still another embodiment, the second communicator is configured to send the information of the electric vehicle including identity, battery specification, total electric capacity and residual electric capacity to the first communicator, and the first communicator is adapted to upload the information to the cloud so as to process the identification and the calculation of charging efficiency and to enable the electric vehicle to be charged at any charging station.

In a further embodiment, the second communicator is configured to send the setting values set by a user to the first communicator, and the processor of the charging apparatus is adapted to perform the designated charging mode such as immediate quick charging, normal charging, or to schedule a start charging time such as starting charging at off-peak power time.

In still a further embodiment, the charging apparatus is electrically connected to a sensor which is adapted to start the charging apparatus and connect to the first communicator and the second communicator, and each electric vehicle has a corresponding electronic tag having information of user and a corresponding stored-value account, and the sensor is configured to identify the electronic tag through RFID technology so as to verify the identity of user and to access the user's stored-value account, thereby enabling the user to reload the stored-value account balance or pay for services from the stored-value account.

In yet a further embodiment, the charging apparatus is electrically connected to the sensor which is adapted to start the charging apparatus and connect to the first communicator and the second communicator, and the sensor is adapted to identify a plate number of the electric vehicle, thereby verifying the identity of user.

In a particular embodiment, the charging apparatus is cooperated with a parking space, and the sensor has video image detection technology (VID) to detect whether the electric vehicle is completely parked in the parking space and to obtain the information of relative position between the electric vehicle and the parking space; according to the information of the electric vehicle including length width, height, and the position of the charge port, the processor is configured to calculate the relative three-dimensional coordinates of the charge port and the parking space and move the connector to connect to the charge port of the electric vehicle.

In a preferred embodiment, the connector is connected to the charging apparatus through a robotic arm, and the robotic arm comprises a rotating apparatus, a first pivot, a second pivot and a telescopic rod which are connected in sequence, and the connector is installed on the telescopic rod; the rotating apparatus is adapted to control the horizontal movements of the connector while the first pivot and the second pivot are configured to control the vertical movements of the connector, and the telescopic rod is used to adjust the length of the robotic arm.

In an advantageous embodiment, an elastic flex tube is connected between the telescopic rod and the connector to enable the connecting angle between the connector and the charge port to be slightly adjusted and corrected when the first instant magnetic force and the second instant magnetic force, which are respectively generated by the primary coil and the secondary coil, are mutually attractive.

Comparing with conventional charging apparatus for electric vehicle, the present invention is advantageous because: (i) the primary coil and the secondary coil are respectively covered by the plastic cover and the plastic shell, and the no power contact design between the connector and the charge port can prevent the danger of electric shock caused by leakage of electricity when wet; (ii) there will be no sparks when connector contacts the charge port such that the charging apparatus can be installed on general gas stations without the concern of exploration during charging process; (iii) without contact, there will be no mechanical wear and spark loss during connection and separation between the connector and the charge port, which increases the service life; (iv) with the first engaging portions and the second engaging portion, the connector can be quick engaged with the charge port, and the connector and the charge port can be kept in constant distance, so that the primary coil and the secondary coil are fixed in the most efficient inductive charging positions, thereby overcoming the problem of excessive energy loss and high charging temperature caused by improper induction distance; (v) the processor and the controller are configured to generate magnetic forces mutually attractive or repulsive so as to enable the connector and the charge port to be engaged and disengaged easily; and (vi) the second communicator is configured to send the setting values set by a user to the first communicator, and the processor is adapted to perform the designated charging mode such as immediate quick charging, normal charging, or to schedule a start charging time such as starting charging at off-peak power time, thereby saving energy and cost.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
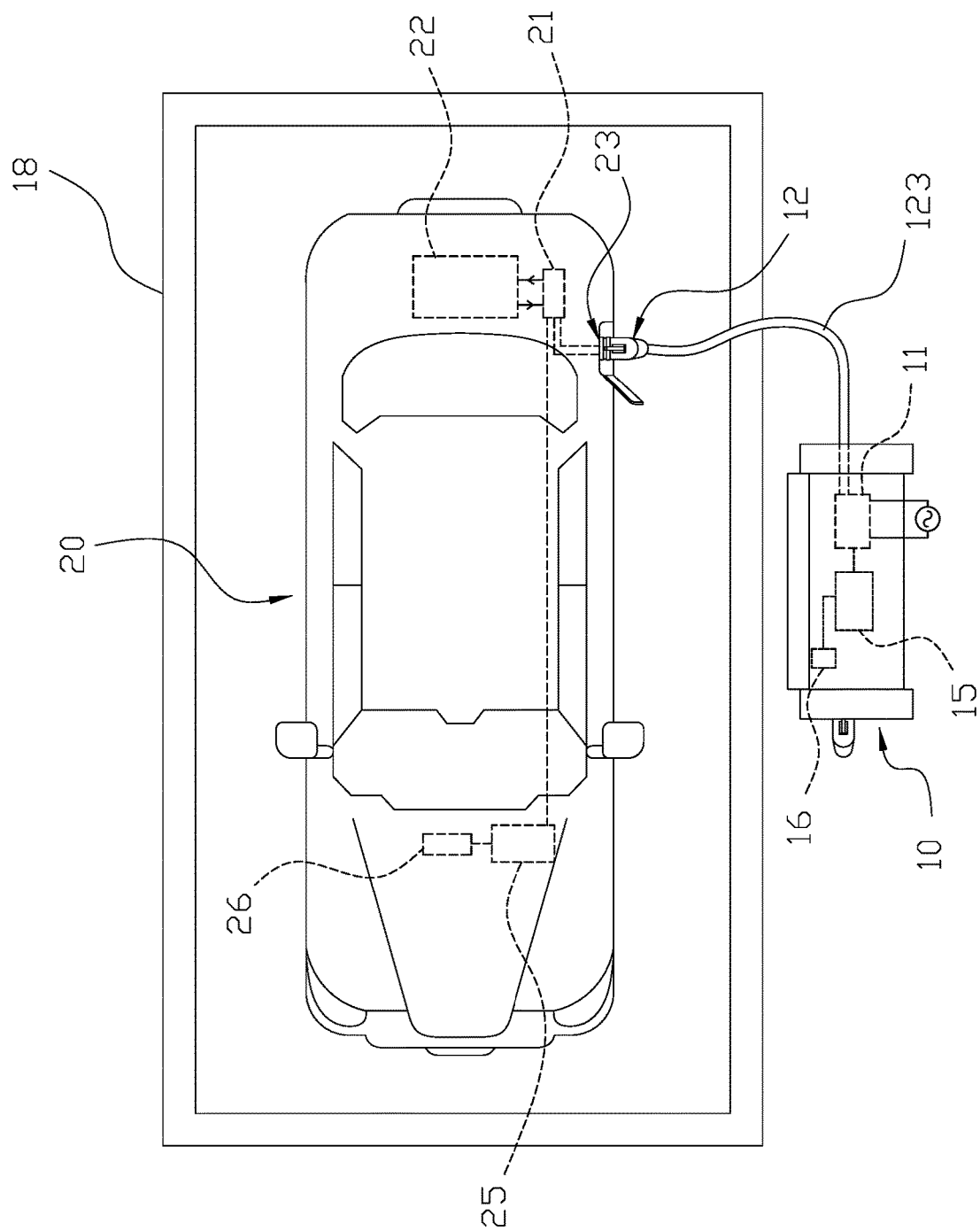
FIG. 1 is a schematic view illustrating an electric vehicle is charged by a charging apparatus of the present invention.
Figure 2:
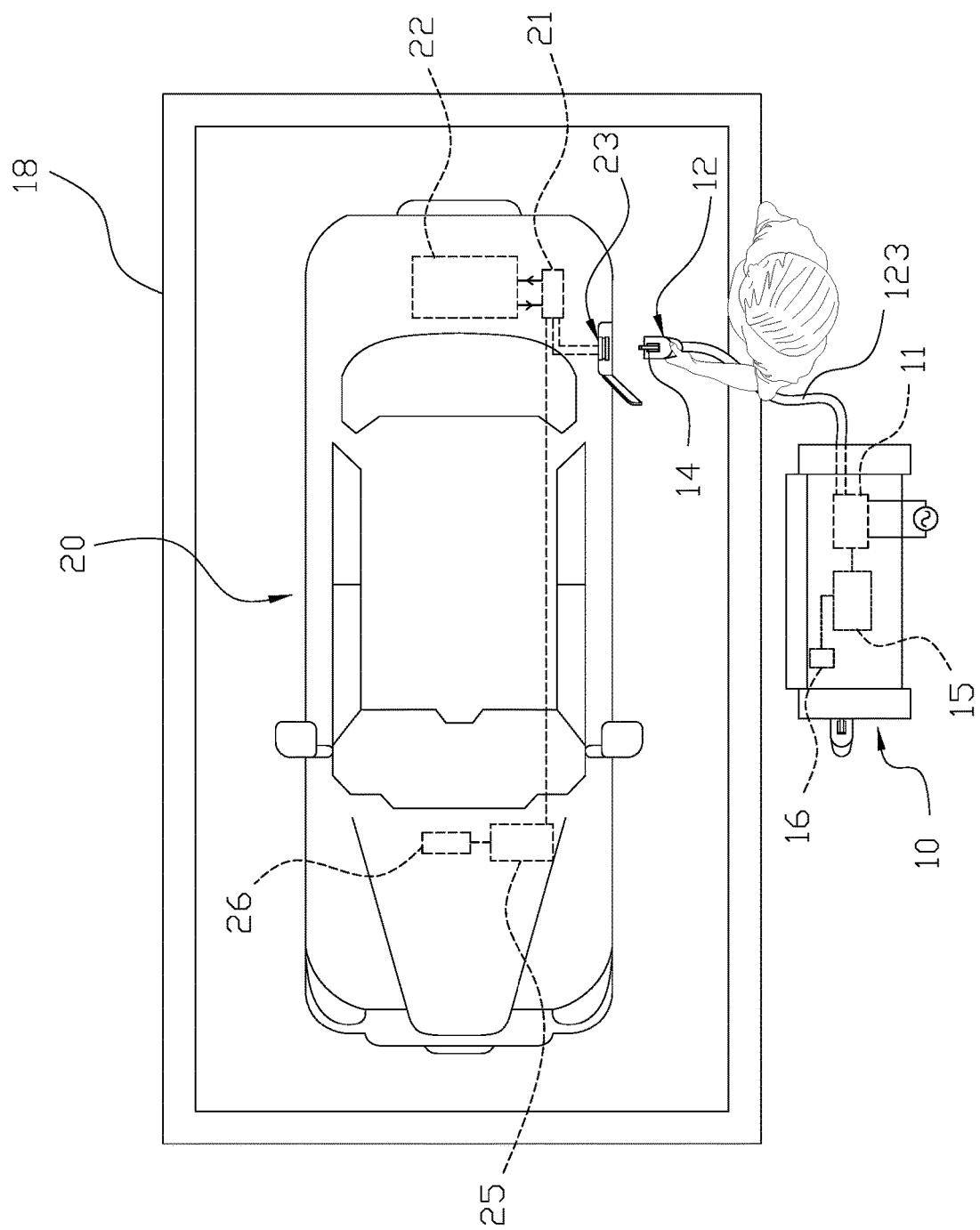
FIG. 2 is a schematic view illustrating the charging apparatus of the present invention is used by a user.
Figure 3:
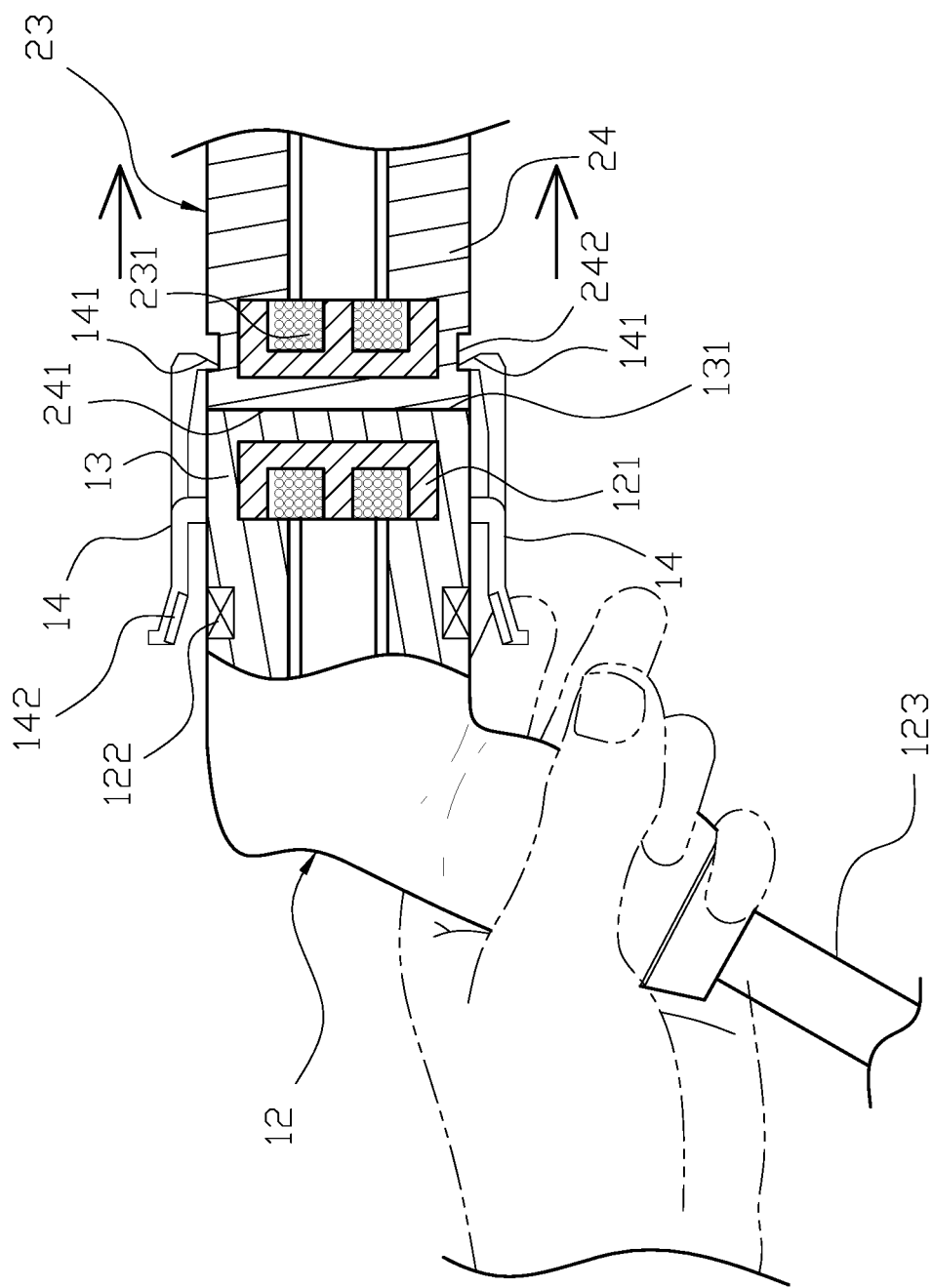
FIG. 3 is a schematic view illustrating a connector of the charging apparatus connects to a charge port for charging in the present invention.
Figure 4:
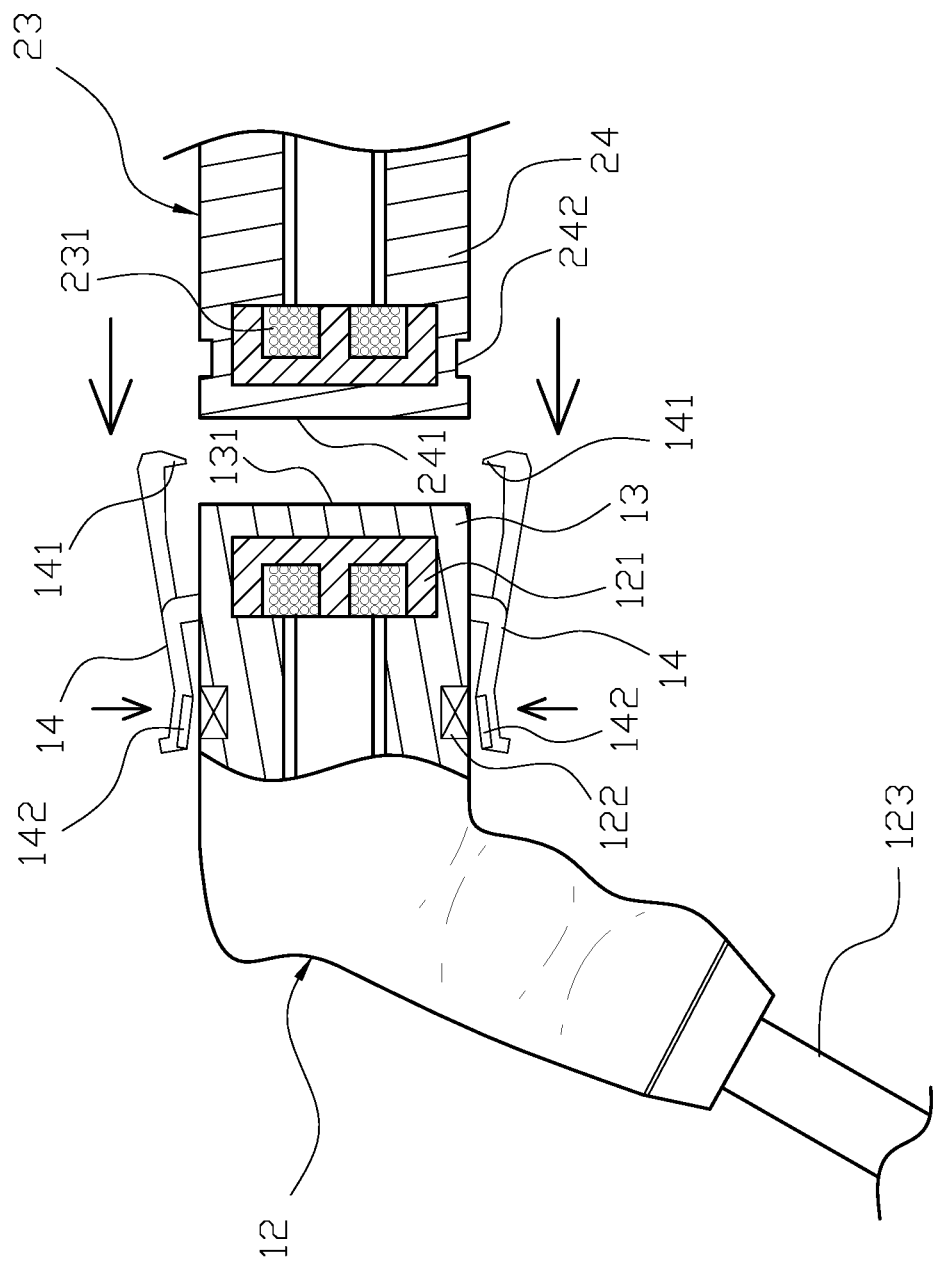
FIG. 4 is a schematic view illustrating the connector of the charging apparatus disconnects from the charge port of the present invention.
Figure 5:
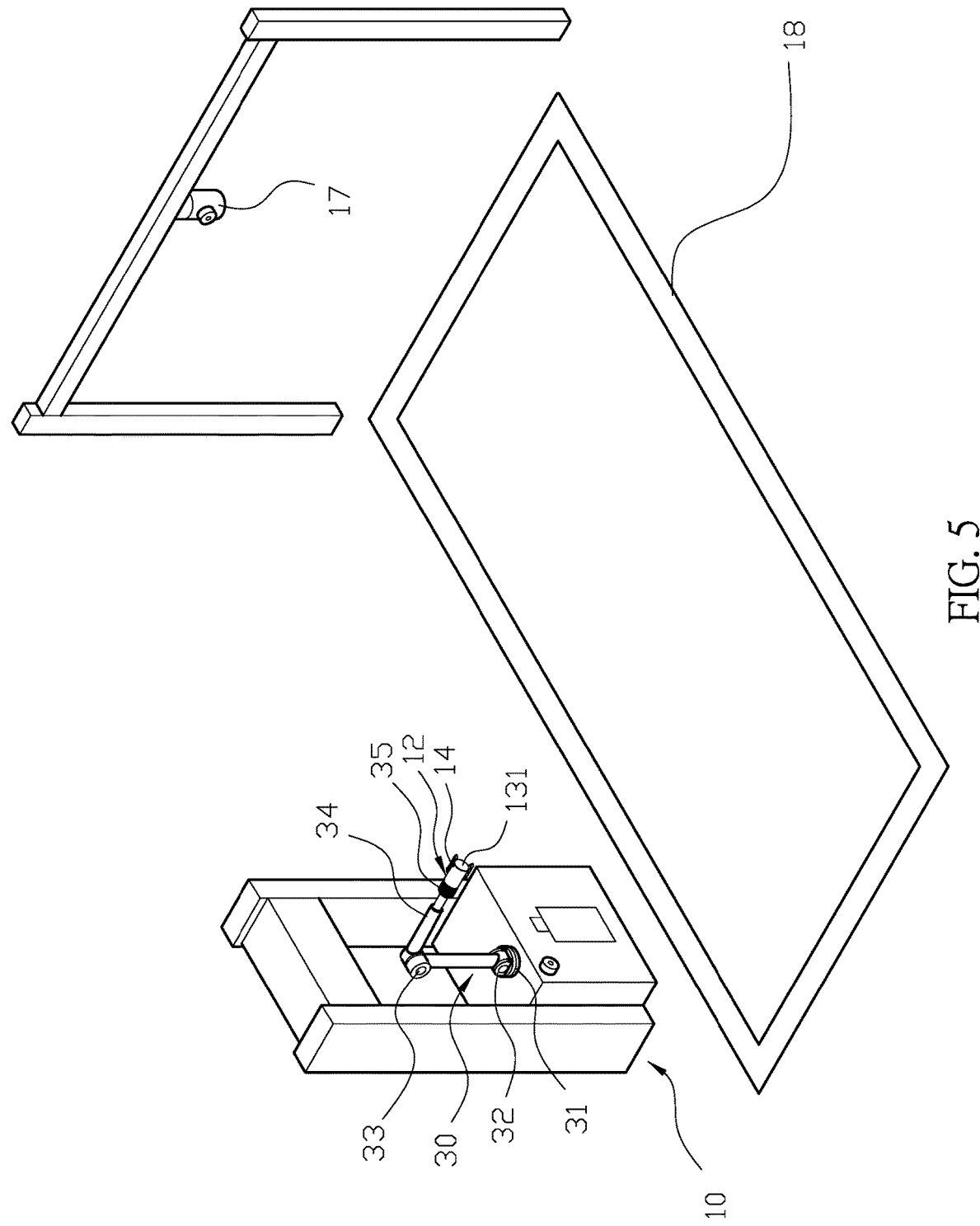
FIG. 5 is a three-dimensional schematic view of a second embodiment of the charging apparatus for electric vehicle of the present invention.
Figure 6:
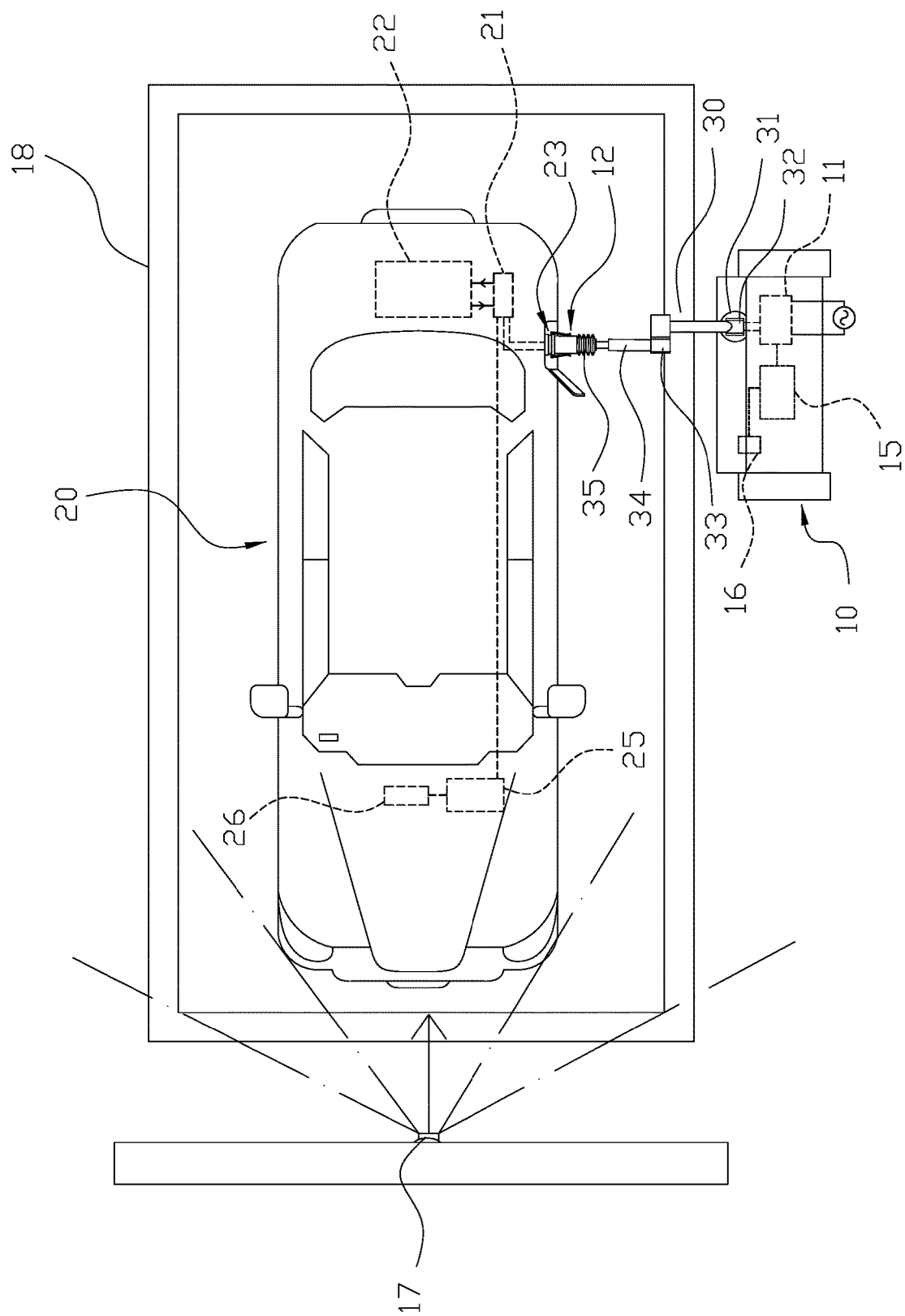
FIG. 6 is a top view of the second embodiment of the charging apparatus for electric vehicle of the present invention.
Figure 7:
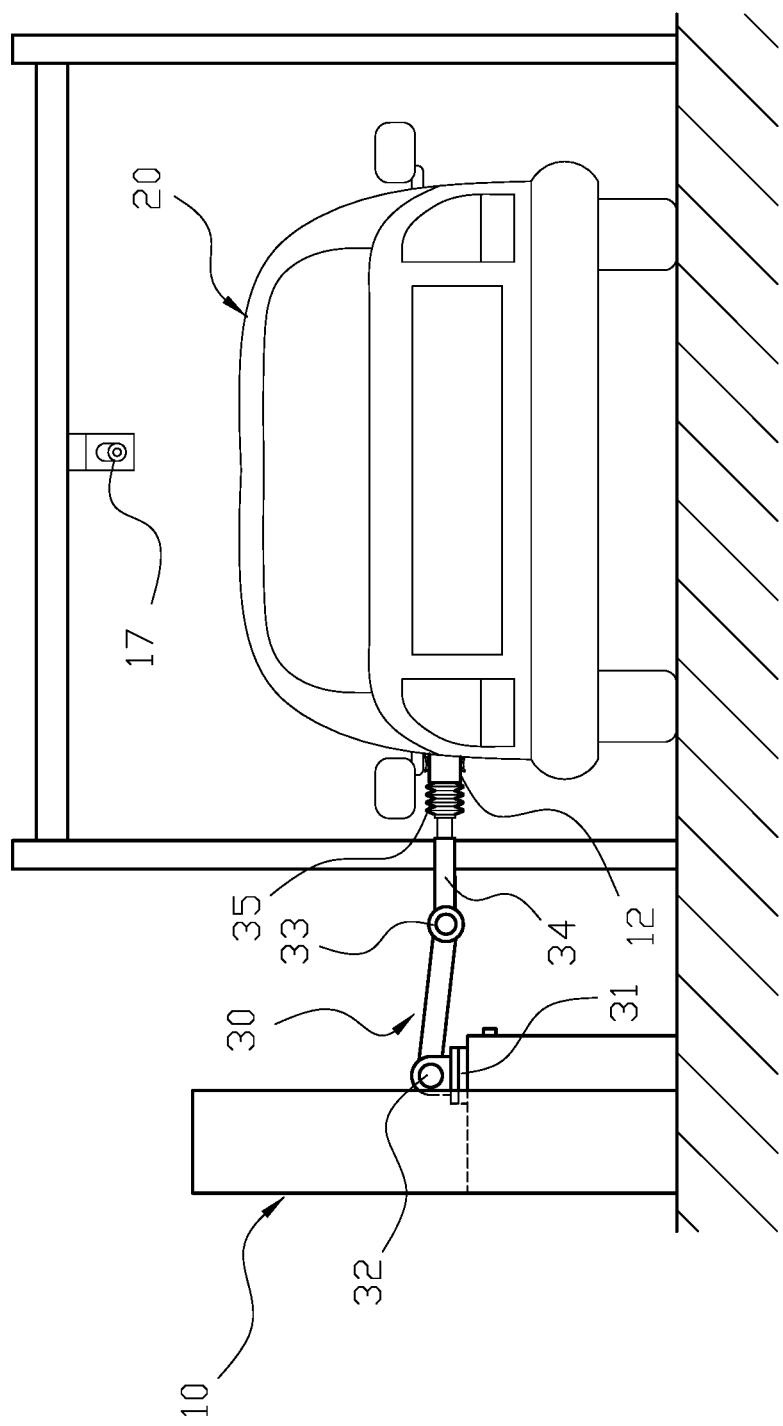
FIG. 7 is a side view of the second embodiment of the charging apparatus for electric vehicle of the present invention.
Figure 8:
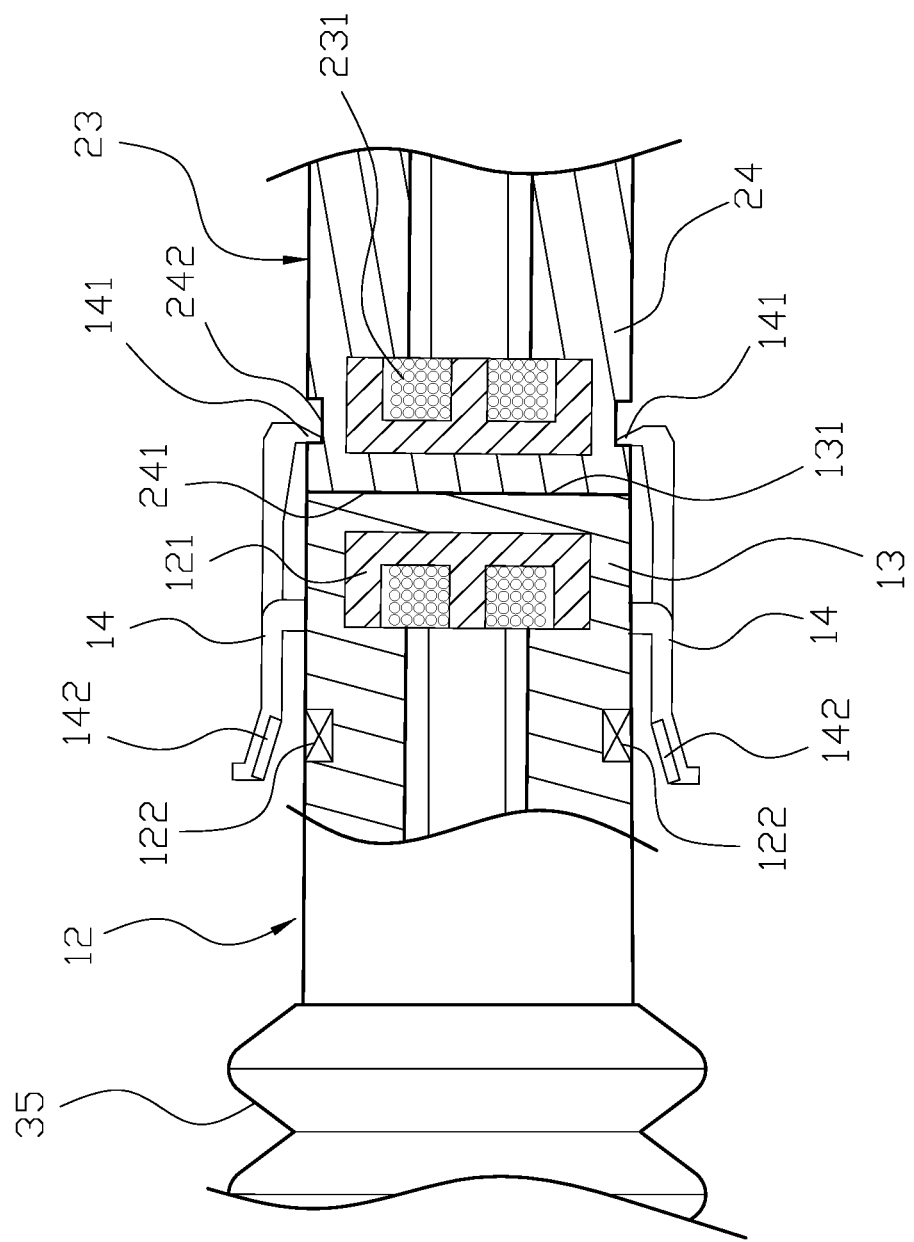
FIG. 8 is a sectional view of the connector of the charging apparatus for electric vehicle in the second embodiment of the present invention.

In order to further understand the goal, characteristics and effect of the present invention, a number of embodiments along with the drawings are illustrated as following:

Referring to FIGS. 1 to 3, the present invention provides a charging apparatus for electric vehicle which comprises a charging apparatus (10) and an electric vehicle (20). The charging apparatus (10) has a rectifier (11) and a mobile connector (12), and the connector (12) covered by a plastic cover (13) has a primary coil (121) which is electrically connected to the rectifier (11). Moreover, the cover (13) comprises a vertical first plane (131), and a plurality of first engaging portions (14) formed at an outer periphery of the cover (13). Furthermore, each of the first engaging portions (14) has two ends, and a hook portion (141) is formed at an end of the first engaging portion (14) which horizontally protrudes from the first plane (131), and the other end of the first engaging portion (14) has a metal shank (142). In addition, the connector (12) comprises an electromagnet (122) positioned close to the shank (142). The electric vehicle (20) has a converter (21), a battery pack (22) and a charge port (23), and the converter (21) is electrically connected to the battery pack (22). Furthermore, the charge port (23) covered by a plastic shell (24) comprises a secondary coil (231) which is electrically connected to the converter (21). The charge port (23) has a vertical second plane (241) and at least a second engaging portion (242). When the first plane (131) of the connector (12) is coupled to the second plane (241) of the charge port (23), the hooks (141) are configured to engage on the second engaging portion (242), and the primary coil (121) and the secondary coil (231) are spaced apart by a fixed distance, thereby achieving the effect of safe charging.

In actual application, referring to FIGS. 1 to 4, the rectifier (11) is adapted to connect to an external alternating current (AC) power supply, and through the rectifier (11), AC is configured to be converted to specified current and voltage for the charging apparatus (10) and transmit AC to the connector (12). Also, the charging apparatus (10) is electrically connected to the connector (12) through a cable (123), and the cover (13) of the connector (12) is configured to cover the primary coil (121) and the electromagnet (122), and the first engaging portions (14) are formed on the outer periphery of the cover (13). The electric vehicle (20) comprises the charge port (23) which is adapted to connect to the connector (12), and the charge port (23) further has the second engaging portion (242). Additionally, the charge port (23) comprises the shell (24) which covers the secondary coil (231), and the secondary coil (231) is electrically connected to the converter (21) and the battery pack (22) of the electric vehicle (20). When the charging apparatus for electric vehicle of the present invention is in use, a user can hold the connector (12) to enable the first plane (131) to couple with the second plane (241) of the charge port (23) of the electric vehicle (20), and the hooks (141) of the first engaging portions (14) are adapted to be engaged with the second engaging portion (242), thereby securing the charge port (23) with the connector (12) and keeping the distance between the primary coil (121) and the secondary coil (231). Meanwhile, the rectifier (11) of the charging apparatus (10) is adapted to provide AC to the primary coil (121), and the inductive coupling between the primary coil (121) and the secondary coil (231) is configured to induce voltage in the secondary coil (231), and the generated AC is adapted to be converted through the converter (21) to direct current (DC) and saved in the battery pack (22), thereby achieving the effect of safe charging.

More specifically, the present invention is advantageous because: (i) the primary coil (121) and the secondary coil (231) are respectively covered by the plastic cover (13) and the plastic shell (24), and the no power contact design between the connector (12) and the charge port (23) can prevent the danger of electric shock caused by leakage of electricity when wet; (ii) there will be no sparks when connector (12) contacts the charge port (23) such that the charging apparatus (10) can be installed on general gas stations without the concern of exploration during charging process; (iii) without contact, there will be no mechanical wear and spark loss during connection and separation between the connector (12) and the charge port (23), which increases the service life; and (iv) with the first engaging portions (14) and the second engaging portion (242), the connector (12) can be quick engaged with the charge port (23), and the connector (12) and the charge port (23) can be kept in constant distance, so that the primary coil (121) and the secondary coil (231) are fixed in the most efficient inductive charging positions, thereby overcoming the problem of excessive energy loss and high charging temperature caused by improper induction distance.

On the other hand, when the connector (12) needs to be detached from the charge port (23), a user can press the shanks (142) to enable the hooks (141) of the first engaging portions (14) to be disengaged from the second engaging portion (242) of the charge port (23), and pull the connector (12) to separate the connector (12) from the charge port (23). Also, the electromagnet (122) is used to attract and hold the shanks (142) of the first engaging portions (14), and the hooks (141) are configured to detach from the second engaging portion (242) so as to detach the connector (12) from the charge port (23).

In another embodiment, referring to FIGS. 1 to 4, the rectifier (11) of the charging apparatus (10) is electrically connected to a processor (15) which is adapted to control the primary coil (121) to generate a first instant magnetic force, and the converter (21) of the electric vehicle (20) is electrically connected to a controller (25) which is configured to control the secondary coil (231) to generate a second instant magnetic force. When the connector (12) is coupled with the charge port (23), the processor (15) and the controller (25) are configured to generate mutual attraction of the first instant magnetic force and the second instant magnetic force so as to enable the first engaging portions (14) to be easy to engage with the second engaging portion (242) and to help in securing the relative position between the connector (12) and the charge port (23). Conversely, when the connector (12) is detached from the charge port (23), the processor (15) and the controller (25) are configured to generate mutual repulsion of the first instant magnetic force and the second instant magnetic force so as to offset the adhesive force between the first plane (131) of the connector (12) and the second plane (241) of the charge port (23) which is caused by long-term coupling, thereby separating the connector (12) and the charge port (23) easily and achieving the function of automatic charging.

In still another embodiment, referring to FIGS. 5 to 8, the processor (15) is connected to a first communicator (16), and the controller (25) is connected to a second communicator (26). The first communicator (16) and the second communicator (26) are configured to communicate with each other so as to determine whether to start charging. The first determination method is that the second communicator (26) send the information of the electric vehicle (20) including identity, battery specification, total electric capacity and residual electric capacity to the first communicator (16), and the first communicator (16) is adapted to upload the information to the cloud so as to process the identification and the calculation of charging efficiency. When the electric vehicle (20) is qualified to charge, the charging apparatus (10) is configured to prepare and start charging process according to the information of the electric vehicle (20) so as to enable the electric vehicle to be charged in different charging stations. The second determination method is that the charging apparatus (10) is electrically connected to a sensor (17) which is adapted to start the charging apparatus (10) and connect to the first communicator (16) and the second communicator (26), thereby reducing the power consumption of the charging apparatus (10). Moreover, the electric vehicle (20) has an electronic tag (27), and the sensor (17) is configured to identify the electronic tag (27) through RFID technology. The electronic tag (27) has a specified radio frequency, and when the electronic tag (27) is in the field detectable by the sensor (17), the electronic tag (27) is adapted to receive energy from the electromagnetic field generated by the sensor (17) and send out a radio signal. The sensor (17) is configured to identify the radio signal so as to receive the information of the electric vehicle (20). The third determination method is that the sensor (17) of the charging apparatus (10) is adapted to identify a plate number of the electric vehicle (20). The sensor (17) is configured to capture the image of the electric vehicle (20), detect the location of the plate of the electric vehicle (20) and recognize the plate number thereon. Since the location of the charging apparatus (10) is configured to provide sufficient light and the electric vehicle (20) is stationary, the sensor (17) is adapted to accurately identify the plate number of the electric vehicle (20). More specifically, a user can input the charging conditions of the electric vehicle (20) through the controller (25), so that the second communicator (26) is configured to send the setting values of the designated charging mode to the first communicator (16), and the processor (15) of the charging apparatus (10) is adapted to perform immediate quick charging, normal charging, or to schedule a start charging time such as starting charging at off-peak power time like 11 p.m. when the electric vehicle (20) staying with the charging apparatus (10) more than one day, thereby efficiently reducing the charging costs.

Furthermore, referring to FIGS. 5 to 8, the connector (12) is connected to the charging apparatus (10) through a robotic arm (30), and the robotic arm (30) comprises a rotating apparatus (31), a first pivot (32), a second pivot (33) and a telescopic rod (34) which are connected in sequence, and the connector (12) is installed on the telescopic rod (34). The rotating apparatus (31) is adapted to control the horizontal movements of the connector (12) while the first pivot (32) and the second pivot (33) are configured to control the vertical movements of the connector (12), and the telescopic rod (34) is used to adjust the length of the robotic arm (30). Moreover, an elastic flex tube (35) is connected between the telescopic rod (34) and the connector (12), and the elastic deformation of the flex tube (35) enables the connecting angle of the connector (12) to be slightly adjusted. In addition, the charging apparatus (10) is cooperated with a parking space (18), and the sensor (17) has video image detection technology (VID) to detect whether the electric vehicle (20) is completely parked in the parking space (18) and to obtain the information of relative position between the electric vehicle (20) and the parking space (18). Thereafter, according to the information of the electric vehicle (20) including length width, height, and the position of the charge port (23), the processor (15) is configured to calculate the relative three-dimensional coordinates of the charge port (23) and the parking space (18), and then obtain the rotating angle of the rotating apparatus (31), the swing angles of the first pivot (32) and the second pivot (33), and the telescopic length of the telescopic rod (34), which realize the optimized displacement path of the robotic arm (30). The robotic arm (30) is configured to be automatically moved to a position close to the charge port (23) of the electric vehicle (20), and the processor (15) and the controller (25) are configured to generate mutual magnetic attraction to adjust the relative position between the connector (12) and the charge port (23) and to help in securing the connector (12) and the charge port (23) at charging positions.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A charging apparatus for electric vehicle comprising a charging apparatus and an electric vehicle, wherein the charging apparatus has an AC converting unit and a mobile connector, and the connector covered by a plastic cover has a primary coil which is electrically connected to the AC converting unit; the cover comprises a vertical first plane, and a plurality of first engaging portions formed at an outer periphery of the cover; each of the first engaging portions has two ends, and a hook portion is formed at an end of the first engaging portion which horizontally protrudes from the first plane, and the other end of the first engaging portion has a metal shank, and the connector comprises an electromagnet positioned close to the shank; and wherein the electric vehicle has a converter, a battery pack and a charge port, and the converter is electrically connected to the battery pack; the charge port covered by a plastic shell comprises a secondary coil which is electrically connected to the converter; the charge port has a vertical second plane and at least a second engaging portion; when the first plane of the connector is coupled to the second plane of the charge port, the hooks are configured to engage on the second engaging portion, and the primary coil and the secondary coil are spaced apart by a fixed distance; wherein the AC converting unit of the charging apparatus is electrically connected to a processor which is adapted to control the primary coil to generate a first instant magnetic force, and the converter of the electric vehicle is electrically connected to a controller which is configured to control the secondary coil to generate a second instant magnetic force; when the connector is coupled with the charge port, the processor and the controller are configured to generate mutual attraction of the first instant magnetic force and the second instant magnetic force; when the connector is detached from the charge port, the processor and the controller are configured to generate mutual repulsion of the first instant magnetic force and the second instant magnetic force;

wherein the processor is connected to a first communicator while the controller is connected to a second communicator, and the first communicator and the second communicator are configured to communicate with each other so as to determine whether to start charging; wherein the AC converting unit of the charging apparatus is adapted to provide alternating current (AC) to the primary coil, and the inductive coupling between the primary coil and the secondary coil is configured to induce voltage in the secondary coil, and the generated AC is adapted to be converted through the converter to direct current (DC) and saved in the battery pack; wherein when the connector detaches from the charge port, the electromagnet is configured to attract and hold the shanks of the first engaging portions, and the hooks are adapted to detach from the second engaging portion so as to detach the connector from the charge port, wherein the charging apparatus is electrically connected to the sensor which is adapted to start the charging apparatus and connect to the first communicator and the second communicator, and the sensor is adapted to identify a plate number of the electric vehicle, thereby verifying the identity of user, wherein the charging apparatus is cooperated with a parking space, and the sensor has video image detection technology (VID) to detect whether the electric vehicle is completely parked in the parking space and to obtain the information of relative position between the electric vehicle and the parking space; according to the information of the electric vehicle including length width, height, and the position of the charge port, the processor is configured to calculate the relative three-dimensional coordinates of the charge port and the parking space and move and connect the connector to the charge port of the electric vehicle, wherein the connector is connected to the charging apparatus through a robotic arm, and the robotic arm comprises a rotating apparatus, a first pivot, a second pivot and a telescopic rod which are connected in sequence, and the connector is installed on the telescopic rod; the rotating apparatus is adapted to control the horizontal movements of the connector while the first pivot and the second pivot are configured to control the vertical movements of the connector, and the telescopic rod is used to adjust the length of the robotic arm.

2. The charging apparatus for electric vehicle of claim 1, wherein the second communicator is configured to send the information of the electric vehicle including identity, battery specification, total electric capacity and residual electric capacity to the first communicator, and the first communicator is adapted to upload the information to the cloud so as to process the identification and the calculation of charging efficiency and to enable the electric vehicle to be charged at any charging station.

3. The charging apparatus for electric vehicle of claim 1, wherein the second communicator is configured to send the setting values set by a user to the first communicator, and the processor of the charging apparatus is adapted to perform the designated charging mode such as immediate quick charging, normal charging, or to schedule a start charging time such as starting charging at off-peak power time.

4. The charging apparatus for electric vehicle of claim 1, wherein the charging apparatus is electrically connected to a sensor which is adapted to start the charging apparatus and connect to the first communicator and the second communicator, and each electric vehicle has a corresponding electronic tag having information of user and a corresponding stored-value account, and the sensor is configured to identify the electronic tag through RFID technology so as to verify the identity of user and to access the user's stored-value account, thereby enabling the user to reload the stored-value account balance or pay for services from the stored-value account.

5. The charging apparatus for electric vehicle of claim 4, wherein an elastic flex tube is connected between the telescopic rod and the connector to enable the connecting angle between the connector and the charge port to be slightly adjusted and corrected when the first instant magnetic force and the second instant magnetic force, which are respectively generated by the primary coil and the secondary coil, are mutually attractive.

* * * * *